(12) United States Patent
Boulter

(10) Patent No.: US 8,790,513 B1
(45) Date of Patent: Jul. 29, 2014

(54) BEVERAGE WATER MAKER

(76) Inventor: Roger Boulter, Harlingen, TX (US)

( * ) Notice: Subject to any disclaimer, the term of this patent is extended or adjusted under 35 U.S.C. 154(b) by 664 days.

(21) Appl. No.: 13/175,513

(22) Filed: Jul. 1, 2011

(51) Int. Cl.
    *C02F 1/68* (2006.01)
(52) U.S. Cl.
    USPC ........... 210/104; 210/105; 210/143; 210/202; 210/206
(58) Field of Classification Search
    None
    See application file for complete search history.

(56) References Cited

U.S. PATENT DOCUMENTS

| | | | |
|---|---|---|---|
| 5,597,487 A * | 1/1997 | Vogel et al. | 210/652 |
| 7,507,334 B1 * | 3/2009 | Sigona | 210/196 |
| 2004/0022898 A1 * | 2/2004 | Zucker | 426/74 |
| 2004/0241299 A1 * | 12/2004 | Zhang | 426/435 |
| 2013/0164411 A1 * | 6/2013 | Skovby et al. | 426/66 |

* cited by examiner

*Primary Examiner* — Terry Cecil
(74) *Attorney, Agent, or Firm* — Patent Law Offices of Rick Martin, P.C.

(57) ABSTRACT

Convenience stores are provided a beverage water processor for coffee and beverages. The "ideal" total dissolved solids (TDS) of perhaps 110 parts per million is achieved without a blendback process. The R/O water is remineralized with a flow through calcite bath. A potassium chloride source is used to inject the exact amount of potassium chloride needed to reach the ideal TDS on the fly before the water reaches the storage reservoir. Alarms trigger a bypass loop to keep the store in business during shutdown. All output water passes through a UV sterilizer.

21 Claims, 8 Drawing Sheets

BEVERAGE WATER MAKER

FIELD OF INVENTION

The present invention relates to remineralizing the purified water from a reverse osmosis (R/O) system to produce a controllable range from about 70 to 250 parts per million (PPM) of total dissolved solids (TDS), thereby producing ideal water for efficient making premium coffee and beverages.

BACKGROUND OF THE INVENTION

Coffee, tea and beverages made from untreated R/O water can be bitter, sour, flat and metallic tasting. Total dissolved solids (TDS) means the total amount of solids that can be recovered in dry form when water is evaporated off of the functional water. R/O water is purified H2O having little or no hardiness ions.

Tap water is a complex solution of chemicals, organics and minerals, and has pH and alkalinity characteristics. Each of these has an effect on the quality of coffee and beverages.

Total Dissolved Solids: During the brewing process solids are extracted from the coffee grounds and without consistent TDS levels the quality of coffee and espresso can range greatly from strong and bitter to weak and underdeveloped. Without controlling the TDS level the consistency of the beverage will vary. Low TDS (<50 ppm) can result in a bitter or tart tasting coffee and espresso. High TDS (>500 ppm) could mean that sodium, calcium, chloride and magnesium are detectable in the final product. Also, high TDS saturated water will not extract at full strength as there is no space left to add the finest of the coffee.

Total Hardness: Hardness ions, such as calcium and magnesium, bind with the extracted coffee bean organics from the brewing process to give the correct flavor to the coffee and espresso beverages. Minerals also help to reduce the acidity of water. Without the proper amount of hardness mineral your coffee will have a high level of astringency or be very bitter.

pH: Water below 7.0 is acidic and corrosive, water above 7.0 is basic and caustic. Natural low pH indicates a lack of mineral in the water, so water will taste flat or bitter (it's like drinking distilled water, which has a pH of about 5.5). As pH increases (>7) the result is an astringent taste. Higher pH also usually indicates a higher alkalinity and possibility of limescale. Due to the fact that a person with sensitive taste can notice a pH shift of as little as 0.1, controlling pH is vital to consistency and taste. The ideal is a pH of around 7.0 to 8.0.

Alkalinity: High alkalinity is a catalyst for scale development in the brewing equipment.

Total Chlorides: Elevated levels of total chlorides are most commonly associated with salt. In normal levels, chlorides will result in a sweet taste to brewed beverages, but at elevated levels can cause sourness. Chlorides are also especially corrosive on stainless steel, quickly eating away at exposed components.

Chlorine: Chlorine can alter the aroma and taste of coffee/espresso by oxidizing the aromatics and oils, reducing the pH balance and imparting chemical/medicinal odors and tastes. Chlorine readily bonds with organics to create compounds that can impart an "earthy or moldy" tone to coffee. In addition, chlorine causes corrosion on metals and can cause brittle o-rings and gaskets (quality commercial espresso machines use Teflon gaskets, especially at the boiler, which helps to reduce chemical-induced problems).

Particulates (dirt, sediment, ferric metals, organic material): These cause plugging of orifices and abrasion on surfaces.

Related prior art includes Pub. No. U.S. 2004/0241299 (2004) to Zhang which discloses the ideal water for making tea. Pub. No. U.S. 2004/0022898 (2004) to Zucker discloses a method to use sea water and adjust sodium, manganese, potassium, and calcium to produce ideal beverage water. An R/O system is used. U.S. Pat. No. 5,597,487 (1997) to Vogel et al. discloses a R/O water purifier for a store or kiosk that injects calcium chloride, potassium chloride, and/or magnesium chloride to create a TDS of up to 100 ppm for drinking water. These dissolved minerals also raise the pH of the R/O water to less acidic. An ultra violet (U/V) sterilizer is used at the outlet.

None of the known prior art provides an in store self contained system that uses a R/O unit to anti-scale the water, then purify city water, calcify the water and inject potassium chloride to achieve a TDS ranging from 80-170 ppm, ideal for coffee and beverages.

Remineralization of the R/O water is accomplished by running the R/O water thru a calcite bed, then using an injection pump and TDS controller to specified set points using potassium chloride or other buffering ingredients. The ingredients in common re-hydration products such as Pedialite and sports drinks are of the chloride family (calcium chloride, potassium chloride. Magnesium chloride etc), also generically referred to as electrolytes. The present invention remineralizes and ph buffers the finished water. This gives the operator complete control of the constituents and the amounts used for remineralization. This also eliminates re-introducing undesirable constituents back into the finished water, such as nitrates, turbidity, off-taste etc. commonly introduced with a blendback system. The entire unit is preassembled, tested, disinfected and shipped on casters ready to be rolled in, connected to water, drain and power. No on-site assembly is required. The present invention provides this ideal water at the rate of several gallons per minute to a coffee shop and/or in store beverage bar.

SUMMARY OF THE INVENTION

The main aspect of the present invention is to provide sterilized process water at a variable flow rate. The process water should have a set TDS between 70-250 ppm and have a pH ranging from 7.0 to 8.0.

Another aspect of the present invention is to provide a maintenance cycle of at least six months between service and replenishment of chemicals.

Another aspect of the present invention is to provide an adjustable TDS means for the operator.

Another aspect of the present invention is to provide a TDS of about 90 ppm calcium and an adjustable means to add the desired amount of sodium or other chloride buffering agents.

Another aspect of the present invention is to provide a sediment filter, a carbon filter and an anti-scale unit prior to the R/O unit.

Another aspect of the present invention is to provide a flow through calcium remineralizing unit after the R/O unit.

Another aspect of the present invention is to provide a realtime TDS sensor and control loop to inject potassium chloride downstream of the R/O unit to provide an adjustable TDS range from about 70 to about 250 ppm.

Another aspect of the present invention is to provide a U/V sterilization unit at the system output.

Another aspect of the present invention is to provide a bypass loop to redirect pre-filtered city water to the U/V sterilizer in alarm conditions including low reservoir alert, high TDS alert and/or low repressurizing pump output pressure.

Another aspect of the present invention is to provide an intelligent controller with transmitter to send flow, alarm and TDS data to a remote central processor.

Other aspects of this invention will appear from the following description and appended claims, reference being made to the accompanying drawings forming a part of this specification wherein like characters designate corresponding parts in the several views.

Some of the design parameters are:
1. Be as maintenance free as possible
2. Be able to remineralize the water for optimal ph and TDS for premium coffee (about 125 to 150 ppm TDS).
3. Have the remineralizatiion controllable and adjustable.
4. Be able to get the remineralization blend in the desired proportions.
5. NOT use raw city water for remineralization. This is commonly known in the industry as a "blend back system".
6. Be able to make the unit so that the remineralization unit only needs to be replenished every 6 to 12 months.
7. Have UV sterilization on-board.
8. Include all necessary pretreatment on-board prior to the R/O unit.
9. Have an automatic bypass system that will route filtered city water to their equipment in the event of equipment malfunction or the demand is greater than the storage on-board.
10. Have ample storage on-board for most operational scenarios.
11. Have the entire unit self contained, on casters and easily installed (plug and play).

Design Criteria for Restaurant and Convenience Store Beverage and Ice Reverse Osmosis Systems It is important to take into consideration many factors in the design and implementation of a successful in-store R/O system. Among them are:
1. Disinfection
   Finished water disinfection is critical from a liability standpoint. A reverse osmosis system removes all of the disinfection protection from the city water source. Algae and bacteria will flourish if not treated. Chlorine, ozone and ultraviolet (UV) are the most accepted methods of disinfection. An example—all water vending machines utilize UV technology to disinfect the product water prior to delivery. Any system dispensing water to the public as drinking water or as an ingredient for beverages, cooking,
ice or any other human consumption should have adequate disinfection.
2. Simplicity and Quality of Equipment
   An in-store R/O unit should be as simple and straightforward as possible. Top quality components and attention to detail are the only way to build the equipment. Total dissolved solids (TDS) meters are necessary to be able to constantly monitor water quality.
3. Necessary Water Quality for Various Pieces of Equipment and Products
   Manufacturers of various equipment and food products recommend different TDS and ph levels for their products. For example, drink mixes may require a lower TDS than icemakers. Ph is another issue of concern. A ph of 7 or slightly higher is ideal. R/O water is, as a function of the process, always slightly acidic and below 7.0 ph. It has been our experience that 100 to 250 ppm TDS is the range that most manufacturers require. To achieve different parameters for each individual piece of equipment or product is difficult, costly, and most importantly not reliable. Various methods can be used. Blendback with city water is a common method although it is difficult to adjust and maintain TDS parameters. Constant monitoring and adjustment is necessary to keep the product water close to recommended standards. Remineralization by injection and/or flow through sacrificial media is relatively simple and renders a very stable and repeatable product.
4. Ease of Installation
   All of the pretreatment, storage, R/O delivery and disinfection is built as a stand-alone package and shipped to the store pretested and ready to go. All that is required on-site is to connect to the incoming water, drain, power and to the drink areas and icemakers. This unit fits through a standard 36 inch walk door.
5. Water and Power Consumption
   Currently, there are two types of membranes used for this type of application, low pressure membranes (LPM) and standard pressure membranes (SPM). There are advantages and disadvantages to both. LPMs use considerably less electricity and if water conditions are ideal (which they clearly are not in Texas) they offer large amounts of purified water using lower pressure, typically around 115 psi. The downside is that they need much more reject water to drain to prevent fouling. Typically, manufacturers recommend a 25% recovery rate. For example for every 4 gallons of water through the system, 1 gallon goes to the tank and 3 gallons go down the drain. SPMs operate at 185 to 200 psi, and run at a 50% or 1 to 1 recovery rate. Given the challenging water conditions in Texas, and the high water and sewers rates, SPMs are the membranes we use in all of our equipment. Another advantage to SPMs over LPMs for Texas is that SPMs respond to cleaning and rehabilitation much better that LPMs, therefore, replacement cost for membranes is considerably lower.
6. Sewage Costs and/or Septic System Overloading
   See number 5 above.
7. Modular Design with Ability to Expand Production on Same Footprint
   The output of the unit can be doubled by adding a second membrane and changing to a larger pump without changing any other components in the unit. A standard unit is equipped with one 4"×40" membrane that will produce approximately 1,800 gallons per day. By adding a second membrane, it will produce 3,600 gallons per day.
8. Ability to Retrofit into Existing Stores with Very Limited Back Room Space
   By utilizing the unit-on-casters approach, it would be fairly easy to retrofit into existing stores. The unit requires a spot about 36 inches wide by 48 inches deep.
9. Proper Pre-Treatment
   All R/O units operating in challenging water need to have proper pretreatment in order to operate successfully. Sediment prefiltration followed by an adequate activated carbon bed removes sediment, VOCs, disinfection chemicals and a large amount of off-tastes. Calcium reduction by ion exchange (softening) or other pretreatment is necessary for membrane longevity. In many areas the Silt Density Index (SDI) is so high that slow sand filtration with a flocculent is necessary as well. Military Highway Water Supply in Texas in the RGV is one source with an SDI that is off the chart. All of the necessary pretreatment is included in and attached to the unit prior to delivery.

10. Amount of Water Storage Needed

This unit has a 200 gallon storage tank. Storage and repressurization can be accomplished in two ways. A bladder type storage tank can be employed that is filled and pressurized directly by the R/O. This approach is simple and inexpensive in that there is no repressurization pump required. The downside is that the amount of water stored in this type of tank is only about 50% of tank capacity at best. This is because it has to have air on the other side of the bladder to propel the water out of the tank. The other disadvantages are that the output from the R/O is compromised because of the pressure it takes to fill into a pressurized tank lowers the pressure drop across the membrane, and consequently lowers the maximum production rate possible. The other downside is that you have no idea how much product water you have in storage. The best mode uses a 200 gallon polyethylene atmospheric pressure tank and a centrifugal repressurization pump. This gives the maximum storage with the smallest possible footprint and the best R/O efficiency.

11. Product Water Delivery System

The best mode uses a Grundfos progressive cavity centrifugal pump on this type of application. It has internal flow and pressure sensing ability and needs no pressure tank. If the flow demand is from 4 ounces per minute to 15 gallons per minute, this pump will self regulate and supply a very steady uniform flow which is very important for beverage dispensers.

12. Automated Bypass in the Event of Equipment Malfunction

Included is an automated bypass system in the event of a malfunction. If, for some reason the unit runs out of water or there is a pressure issue, or an elevated TDS is the storage reservoir the system will automatically switch over to pretreated city water and an audible signal would begin which would alert the store attendant to call for service.

13. Leaks and Leak Containment

Not all stores will have a floor drain close by. Our approach is to build a containment or "drip pan" into the unit so any leaks would collect in the drip pan and be routed to the drain. This would facilitate retrofits in existing stores and reduce water damage to inventory.

14. Environmental Impact

All of the water vending units have antiscale units. By removing all ion exchange water softeners and utilizing this new green technology, we have eliminated all salt usage. The salt brine from ion exchange water softeners is all flushed down the drain. This is bad for septic systems as well as municipal sewage systems. There are some states such as California considering a ban on ion exchange water softeners. There is a cost savings associated with this antiscale unit as well, as these antiscale units require no recharge or backwash and are maintenance free.

15. Operator Interface

Simplicity is a key issue in this type of application. There is only an on/off switch and an audible alarm for the store attendant to be concerned with. Pressure, flow rates, TDS, etc. is monitored by a technician on a regular basis.

16. Online Monitoring

Online monitoring for these units is an option for a central headquarters to monitor, control hundreds of stores to assure uniform quality of coffee and beverages.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION

Figure 1:
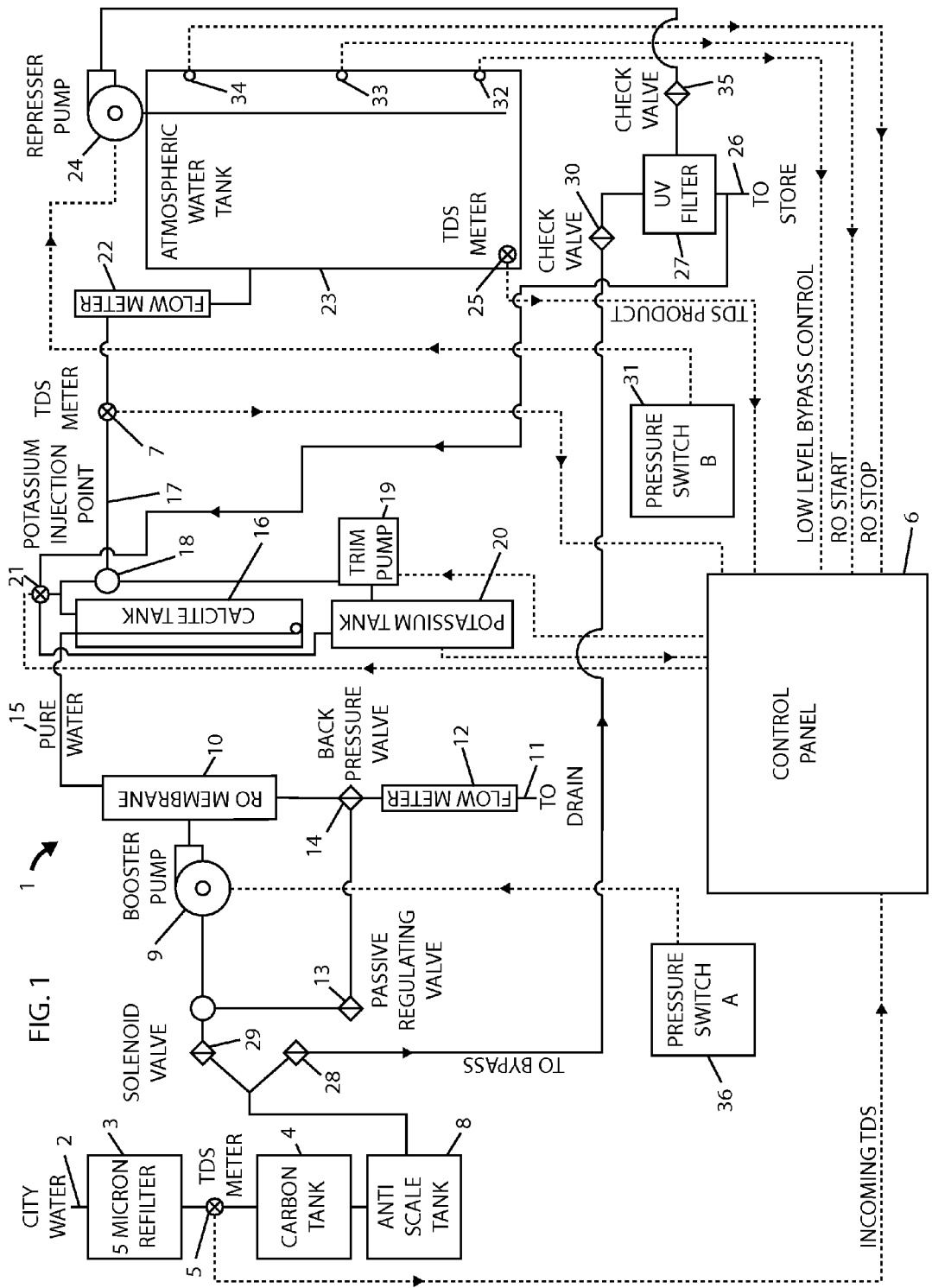
FIG. 1. is a schematic of the preferred embodiment beverage water maker.

Referring first to FIG. 1 the beverage water processor 1 starts with a city water inlet 2 into a 5 micron sediment filter 3 which feeds the activated carbon tank 4. A TDS meter 5 displays on the control panel 6 next to the output TDS meter 7. The antiscale unit 8 microcrystallizes the hardness ions in the water before it is piped to the booster pump 9 which feeds the R/O unit 10. The R/O unit sends its wastewater to drain 11 with a flowmeter 12 indicating wastewater flow. The recycle valve 13 and R/O backpressure valve 14 recirculate a portion of the waste water and route the rest to drain in a known manner.

The pure R/O water 15 flows through a calcite tank 16 for remineralization. The on the fly control pipe 17 has a TDS sensor 7. Upstream from this TDS sensor 7 is a potassium injection point 18. The TDS sensor 7 sends its signal to the controller 6 which maintains a setpoint TDS by triggering the trim pump 19 to inject potassium chloride from the potassium chloride reservoir 20 to the potassium injection point 18. The level in the potassium chloride reservoir 20 is maintained by a level sensor (not shown), and the controller 6 opening a valve 21 which feeds the remineralized water from the repressure pump 24 to the potassium chloride reservoir 20.

The flowmeter 22 indicates the processed water flow into the atmospheric reservoir (nominally 200 gallons) 23. When the store 26 demands water, the repressurizing pump 24 is turned on delivering water through the UV sterilizer 27.

Three alarm conditions trigger the bypass loop valves 28, 29. If the TDS meter 25 goes out of range, then the valve 28 sends the filtered pre-treated water to the UV filter through a one way check valve 30. If the repressurizing pump fails as sensed by pressure switch 31, then the bypass valve 28 is activated. If the low level reservoir sensor 32 is activated, then bypass valve 28 is activated.

Reservoir 23 level sensors 33, 34 activate the R/O unit via the controller 6. A check valve 35 prevents bypass water from backfeeding into the repressurizing pump 24. Pressure sensor 36 indicates that the R/O booster pump 9 has adequate feed flow, and if not shuts it down.

Figure 2:
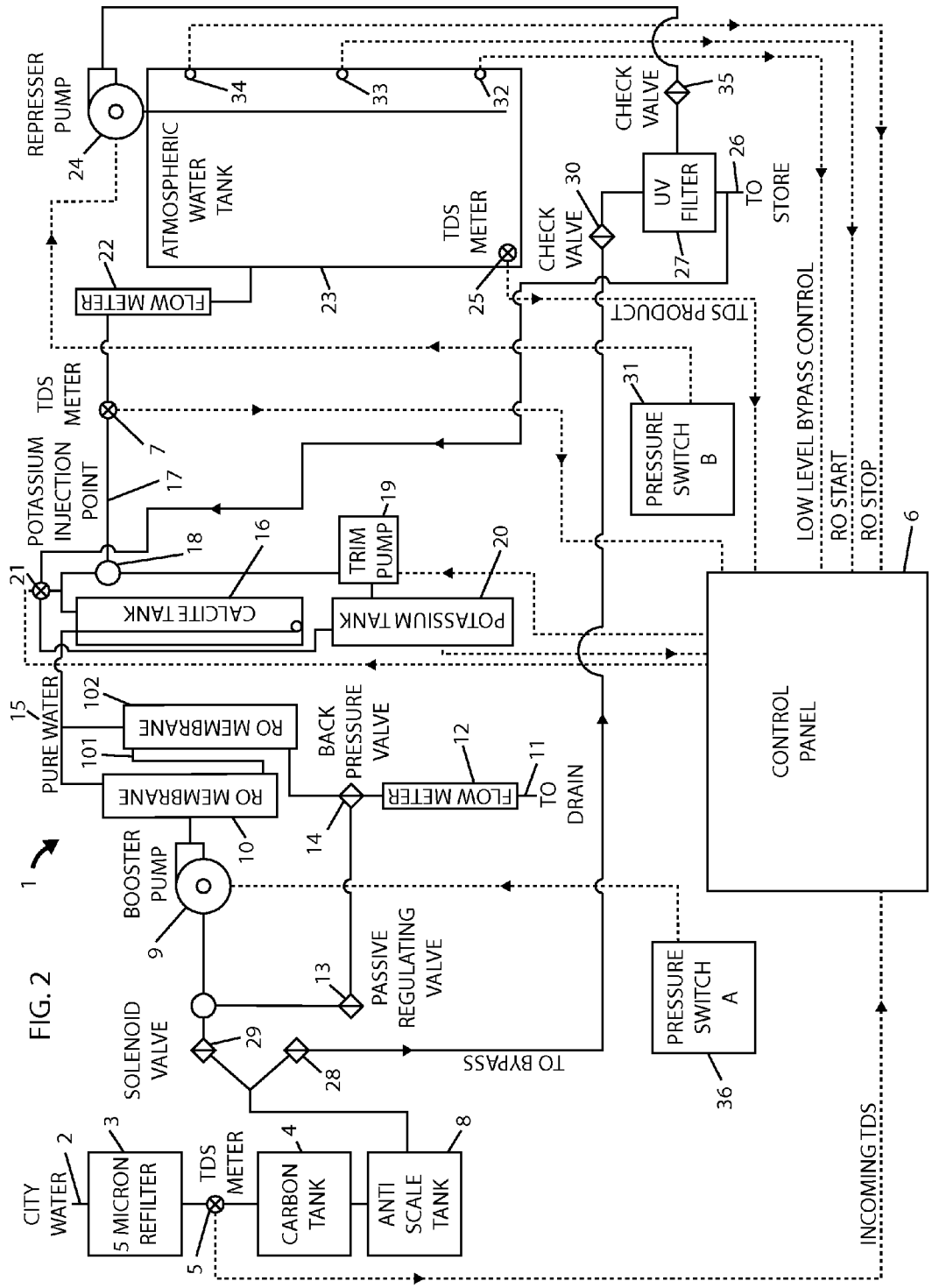
FIG. 2. is a schematic of a high volume embodiment beverage water maker.

Referring next to FIG. 2 all components are the same as shown in FIG. 1 but for a second R/O unit 100 which is connected via pipe 101 in series with R/O unit 10 to double the flowrate of the entire system. R/O units 10, 102 share a common outlet pipe.

Figure 3:
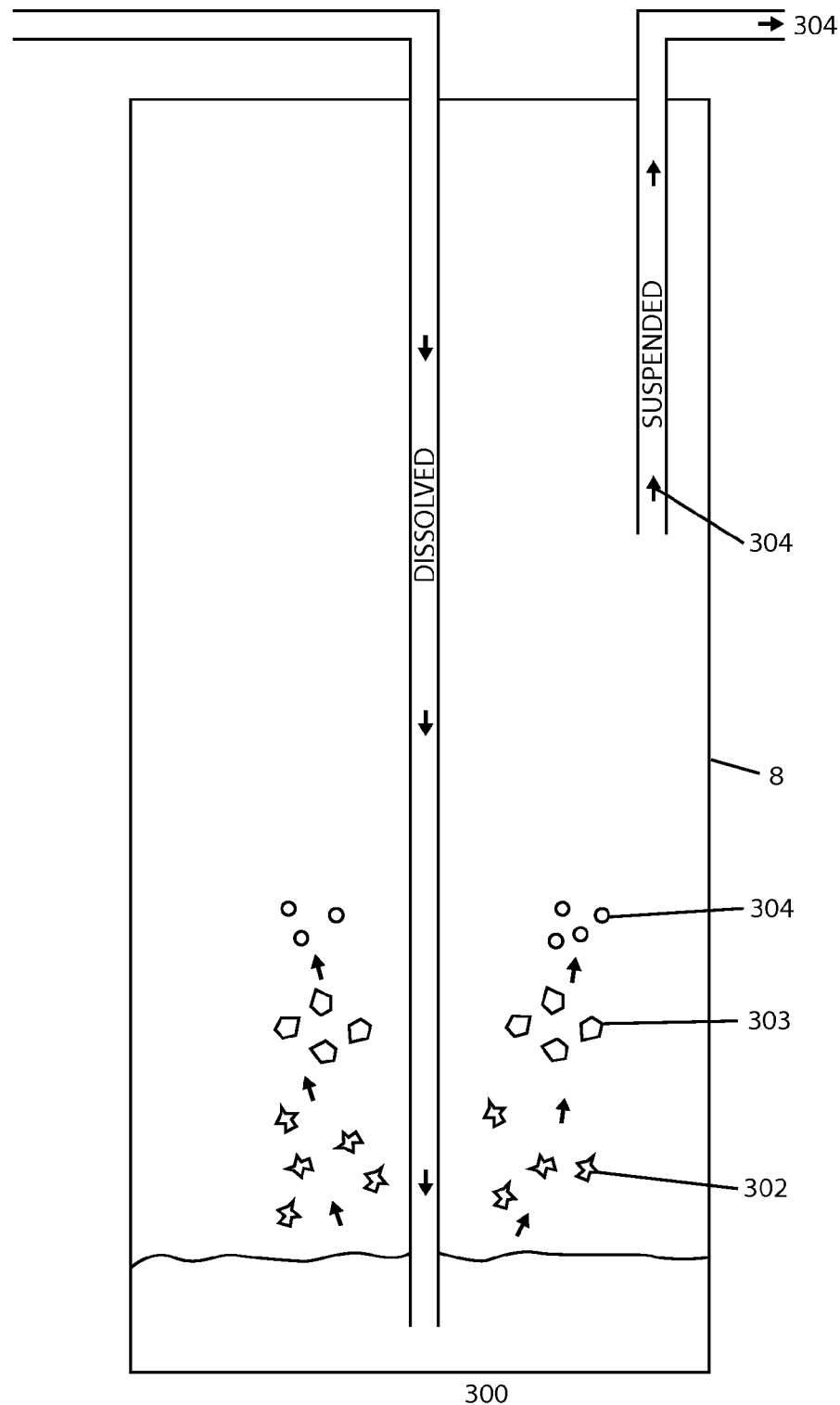
FIG. 3. (prior art) is a cross sectional view of the antiscale unit.

Referring next to FIG. 3 the prior art antiscale unit 8 is shown in operation. Process water having dissolved minerals enters at the bottom 300 of unit 8 into a bed of absorber particles 302. One manufacturer is Filtersorb SP3 Saltless Anti-Scale Media that removes dissolved calcium and magnesium by forming suspended particulates 303 which are sent downstream as suspended particles 304 to the R/O unit 10 which separates them out to drain 11.

Figure 4:
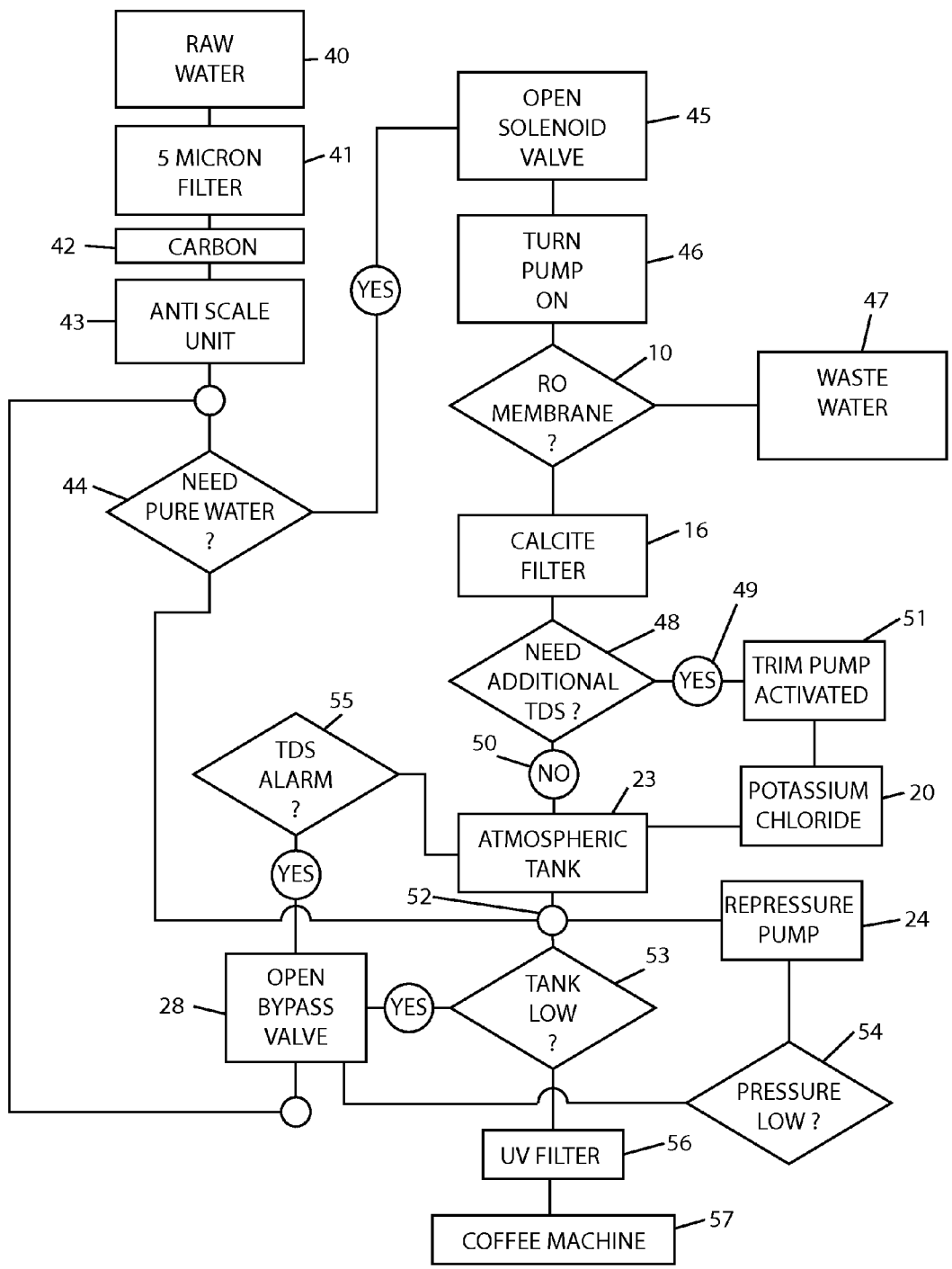
FIG. 4. is a logic flow chart of the preferred embodiment.

Referring next to FIG. 4 the basic control functions of controller 6 are shown. Raw water 40 is first treated by anti-sediment filter 41 then a carbon filter 42. The antiscale unit 43 transforms dissolves minerals into suspended minerals. When the reservoir demands a replenishment of pure water at 44, solenoid valve 29 of FIG. 1 is opened in step 45 and the R/O pump 9 is turned on in step 46. The R/O unit sends about half the incoming water to drain in step 47.

The controller 6 reads the TDS on the fly meter 7 and decides whether at step 48 to add potassium chloride, yes at 49 or no at 50. If no, then the water goes to the reservoir 23. If yes, then the trim pump 19 is activated at step 51 which injects potassium chloride or other suitable remineralization substance from its reservoir 20 to the feed line 17 to the atmospheric reservoir 23.

The atmospheric tank if low at step 52 as sensed by a level sensor turns on the R/O system at 44. The bypass valve 28 is opened if any one of the three alarms (TDS 55, low pressure on repressurizing pump 24, low reservoir 53) is triggered. The store makes coffee at 57 and receives UV sterilized water from step 56.

Figure 5:
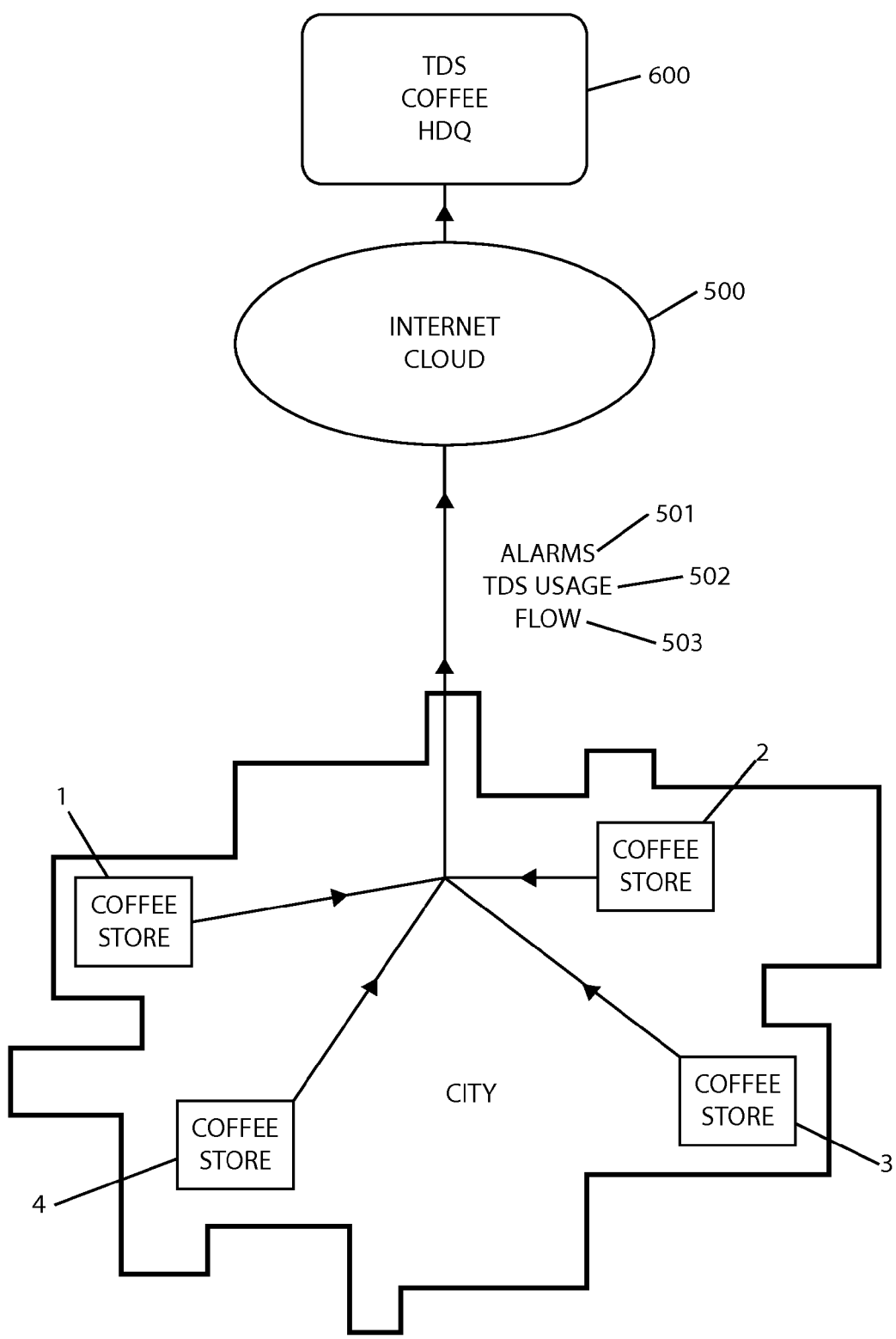
FIG. 5. is a schematic of a multi-store system.

Referring next to FIG. 5 the controllers on the beverage processors at each store 1, 2, 3, 4, are using computer interfaces to the internet 500. The critical data from each beverage processor includes alarms 501, TDS levels 502 and store flowrates 503. The TDS coffee headquarters 600 can send technicians for alarms and calculate periodic maintenance with this data. Central control of all store TDS quality is monitored.

Figure 6:
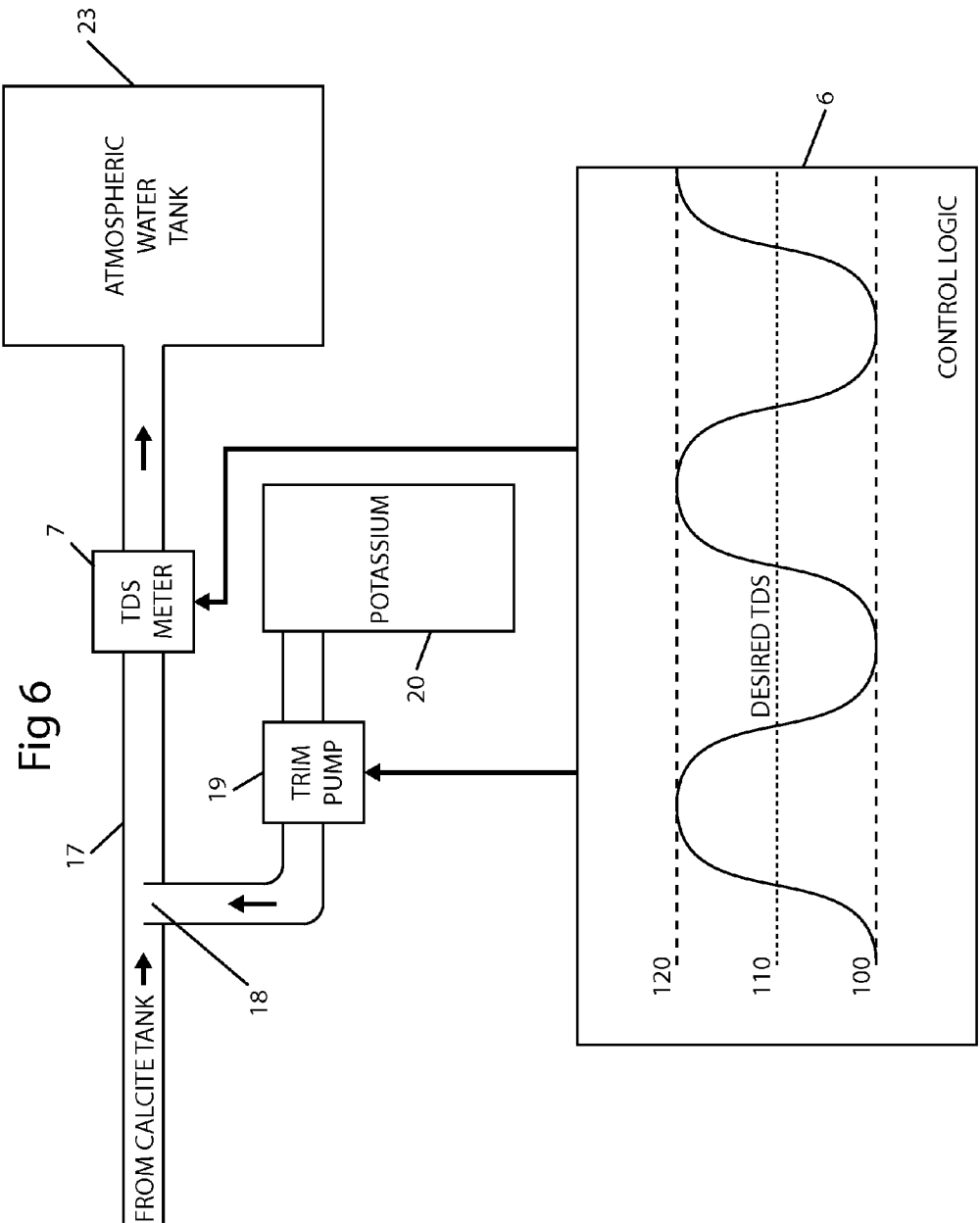
FIG. 6. is a schematic of the on the fly TDS control loop.

Referring next to FIG. 6 the on the fly TDS control loop is presented. The injection point 18 for potassium chloride is upstream from the TDS meter 7 as shown in FIG. 1. The controller 6 uses a simple on/off circuit for the trim pump 19 to keep a range (nominally 100-120) of desired TDS, with the setpoint TDS at 110 parts per million.

Figure 7:
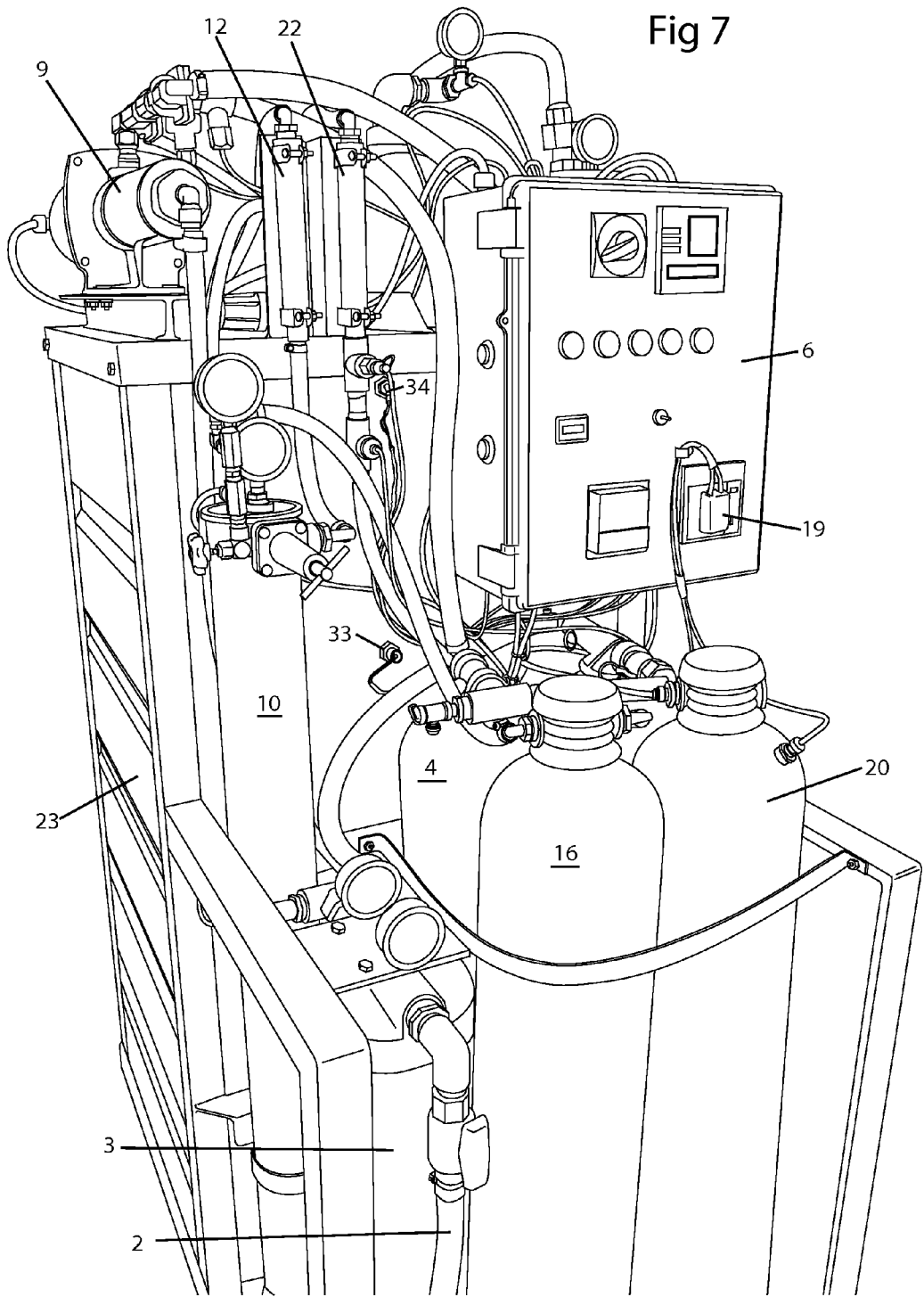
FIG. 7. is a front elevation view of the preferred embodiment.
Figure 8:
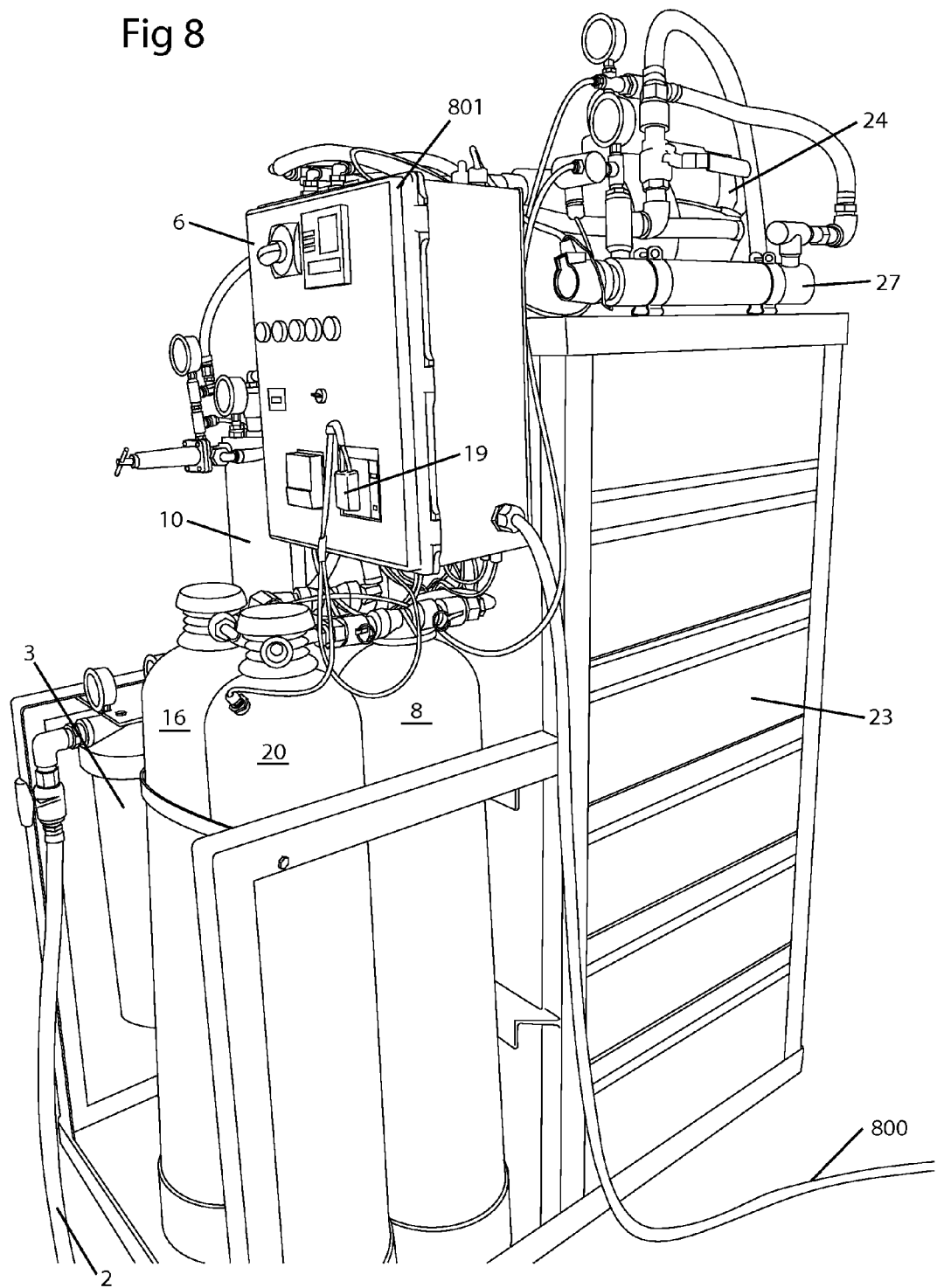
FIG. 8. Is a right side perspective view of the preferred embodiment.

Referring next to FIGS. 7, 8 the FIG. 1 system 1 is shown in its best mode. Not shown are casters. The power cord 800 routes all electric power through controller 6. If the door 801 is opened, then all power is shut off.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. A beverage water processing system comprising:
   a raw water inlet;
   a sediment filter connected to the raw water inlet;
   a carbon filter connected to the sediment filter;
   an antiscale processor connected to the carbon filter which then feeds into an R/O membrane separation unit;
   an outlet of the R/O membrane separation unit sending R/O water to a calcium remineralizing unit;
   said calcium remineralizing unit adding dissolved calcium to the R/O water to establish a pH ranging from about 7.0 to 8.0:
   a connecting pipe from the calcium remineralizing unit to a storage container;
   said connecting pipe having a total dissolved solids (TDS) sensor which feeds a controller a TDS signal;
   said controller controlling a dissolved solids injection means functioning to inject a dissolved solids fluid upstream from the TDS sensor to maintain a TDS range from about 70 to about 250 parts per million; and
   a system outlet from the storage container.

2. The system of claim 1 further comprising a bypass loop comprising:
   a sensing means functioning to detect an alarm condition comprising a low level in the storage container or a TDS signal outside a selected range, or a low output pressure,
   wherein upon sensing any one of these alarm conditions, the controller activates a bypass loop from the output of the antiscale unit to the system outlet.

3. The system of claim 1, wherein the storage container further comprises an atmospheric tank having a re-pressurizing delivery pump.

4. The system of claim 3, further comprising in ultra violet (UV) sterilizer on the system outlet.

5. The system of claim 4, further comprising a bypass loop comprising:
   a sensing means functioning to detect an alarm condition comprising a low level in the storage container and/or a TDS signal outside a selected range and/or a failure of the re-pressurizing delivery pump,
   wherein upon sensing any one of these alarm conditions, the controller activates a bypass loop from the output of the antiscale unit to the UV sterilizer at the system outlet.

6. The system of claim 1, wherein the dissolved solids injection means further comprises a potassium chloride reservoir which is replenished by the system outlet via a level sensor in the potassium chloride reservoir and the controller controlling a pump at an exit port in the potassium chloride reservoir.

7. A beverage water processor comprising:
   a raw water inlet feeding a pre-treatment filter;
   said pre-treatment filter feeding an antiscale unit which feeds an R/O membrane separation unit;
   an outlet of the R/O membrane separation unit feeding a flow through calcium remineralizing unit which establishes a pH ranging from about 7.0 to about 8.0;
   said calcium remineralizing unit feeding an on the fly TDS control loop which comprises a potassium chloride reservoir having an injection pump into a pipe upstream from a total dissolved solids (TDS) sensor that sends a TDS signal to a controller that controls the injection pump to maintain a setpoint TDS in the process water leaving the pipe;
   a reservoir that stores the process water leaving the pipe; and
   a delivery means functioning to send the reservoir water to a system outlet.

8. The beverage water processor of claim 7 further comprising a UV sterilizer at the system outlet.

9. The beverage water processor of claim 8 further comprising a bypass loop from the antiscale unit to the UV sterilizer.

10. The beverage water processor of claim 9 further comprising an automatic alarm activator which opens the bypass loop.

11. The beverage water processor of claim 10, wherein the automatic alarm activator has a reservoir low level trigger and a low level TDS trigger and a low pressure delivery means trigger.

12. The beverage water processor of claim 7, wherein the system outlet replenishes the potassium chloride reservoir using a level sensor in the potassium chloride reservoir and a level controller.

13. The beverage water processor of claim 7, wherein the reservoir further comprises an atmospheric reservoir, and wherein the delivery means further comprises a repressurizing pump connected to the atmospheric reservoir.

14. The beverage water processor of claim 7, wherein the pre-treatment filter further comprises a sediment filter feeding a carbon filter.

15. A beverage water processing system comprising:
a raw water inlet feeding an R/O membrane separation unit;
an outlet of the R/O membrane separation unit feeding a flow through remineralizing unit which establishes a pH ranging from about 7.0 to about 8.0;
said remineralizing unit feeding a TDS control loop which comprises a remineralization reservoir having an injection pump into a pipe upstream from a total dissolved solids (TDS) sensor that sends a TDS signal to a controller that controls the injection pump to maintain a setpoint TDS in the process water leaving the pipe;
a reservoir that stores the process water leaving the pipe; and
a delivery means functioning to send the reservoir water to a system outlet.

16. The beverage water processor of claim 15 further comprising a UV sterilizer at the system outlet.

17. The beverage water processor of claim 16 further comprising a bypass loop from the raw water inlet to the UV sterilizer.

18. The beverage water processor of claim 17 further comprising an automatic alarm activator which opens the bypass loop.

19. The beverage water processor of claim 18, wherein the automatic alarm activator has a reservoir low level trigger and a low level TDS trigger and a low pressure delivery means trigger.

20. The beverage water processor of claim 15, wherein the remineralizing reservoir is a potassium chloride reservoir and the system outlet replenishes the potassium chloride reservoir using a level sensor in the potassium chloride reservoir and a level controller.

21. A beverage water processor comprising;
a raw water inlet feeding an R/O membrane separation unit;
an outlet of the R/O membrane separation unit feeding a flow through remineralizing unit which establishes a pH ranging from about 7.0 to about 8.0;
said remineralizing unit feeding a TDS control loop which comprises a remineralization reservoir having an injection pump into a pipe upstream from a total dissolved solids (TDS) sensor that sends a TDS signal to a controller that controls the injection pump to maintain a setpoint TDS in the process water leaving the pipe;
a reservoir that stores the process water leaving the pipe; and
a delivery means functioning to send the reservoir water to a system outlet.

\* \* \* \* \*